(12) United States Patent
Iannone et al.

(10) Patent No.: US 6,792,207 B2
(45) Date of Patent: Sep. 14, 2004

(54) OPTICAL WDM NETWORK HAVING MIXED WAVELENGTH ROUTING AND FIBER ROUTING CROSS-CONNECT SWITCHES

(75) Inventors: Eugenio Iannone, Milan (IT); Filippo Bentivoglio Ravasio, Cassina de Pecchi (IT)

(73) Assignee: Cisco Technology, Inc., San Jose, CA (US)

( * ) Notice: Subject to any disclaimer, the term of this patent is extended or adjusted under 35 U.S.C. 154(b) by 586 days.

(21) Appl. No.: 09/800,886

(22) Filed: Mar. 8, 2001

(65) Prior Publication Data

US 2002/0030867 A1 Mar. 14, 2002

(51) Int. Cl.[7] .............................. H04B 10/08; H04J 14/00
(52) U.S. Cl. .............................. 398/51; 398/12; 398/19; 398/45; 398/50; 398/54; 398/56
(58) Field of Search ............................. 398/12, 19, 45, 398/50, 56, 51, 54

(56) References Cited

U.S. PATENT DOCUMENTS

| | | | |
|---|---|---|---|
| 5,457,556 A | * 10/1995 | Shiragaki ...................... | 398/50 |
| 5,805,320 A | 9/1998 | Kuroyanagi et al. .......... | 398/79 |
| 6,160,651 A | * 12/2000 | Chang et al. .................. | 398/79 |

FOREIGN PATENT DOCUMENTS

| | | |
|---|---|---|
| EP | 620 694 | 10/1994 |
| EP | 752 794 | 1/1997 |

OTHER PUBLICATIONS

Masahiko Fujiwara, "Advanced Photonic Switching Technology for Communications" IEICE Transactions on Communications E78–B May 1995 Tokyo, Japan. Pp. 644–653.

* cited by examiner

Primary Examiner—M. R. Sedighian
(74) Attorney, Agent, or Firm—Baker Botts L.L.P.

(57) ABSTRACT

An optical wavelength-division-multiplexing (WDM) network has at least one transit node, where a majority of received channels are destined for a remote node, and at least one hub node, where a majority of received channels are switched to a local destination. The network follows a channel-level protection scheme, and at least one of the nodes has a cross-connect switch of a tandem design with a wavelength switch portion optically positioned in a feedback path of a space switch portion. Alternatively, the transit node has a tandem switch design, where the space switch interfaces with the network fibers, and the hub node has at least a wavelength switch that interfaces with the network fibers. The capacities of the respective wavelength and space switch portions of the tandem cross-connect are configured according to the expected ratio of local traffic to passthrough traffic.

12 Claims, 5 Drawing Sheets

OPTICAL WDM NETWORK HAVING MIXED WAVELENGTH ROUTING AND FIBER ROUTING CROSS-CONNECT SWITCHES

BACKGROUND OF THE INVENTION

The present invention relates generally to optical networks that employ wavelength division multiplexing and, more particularly, to optical networks that use optical cross-connect switches in transit and hub nodes.

Many existing long distance telecommunication systems include spans of optical fiber that link digital switches in a network. Such systems, however, often operate at a single transmission wavelength and use time division multiplexing, which can restrict expansion of the system to handle larger volumes of voice or data communications.

Wavelength division multiplexing (WDM) provides a technique to accommodate increased traffic in existing long distance telecommunication networks. WDM takes advantage of the large bandwidth of optical fibers and sends multiple communications down a single optical fiber in separate wavelength channels. As a result, a WDM system can multiply the capacity of the system compared with the use of only a single wavelength.

Other prospects for expanding the capacity of an existing network provide significant obstacles. For instance, adding new optical fibers to handle more traffic is expensive and can complicate management of the existing network. Also, increasing the bit rate of a single wavelength system can cause transmission problems, such as polarization mode dispersion or self-phase modulation. WDM can avoid these problems while using the existing fiber infrastructure.

Figure 1:
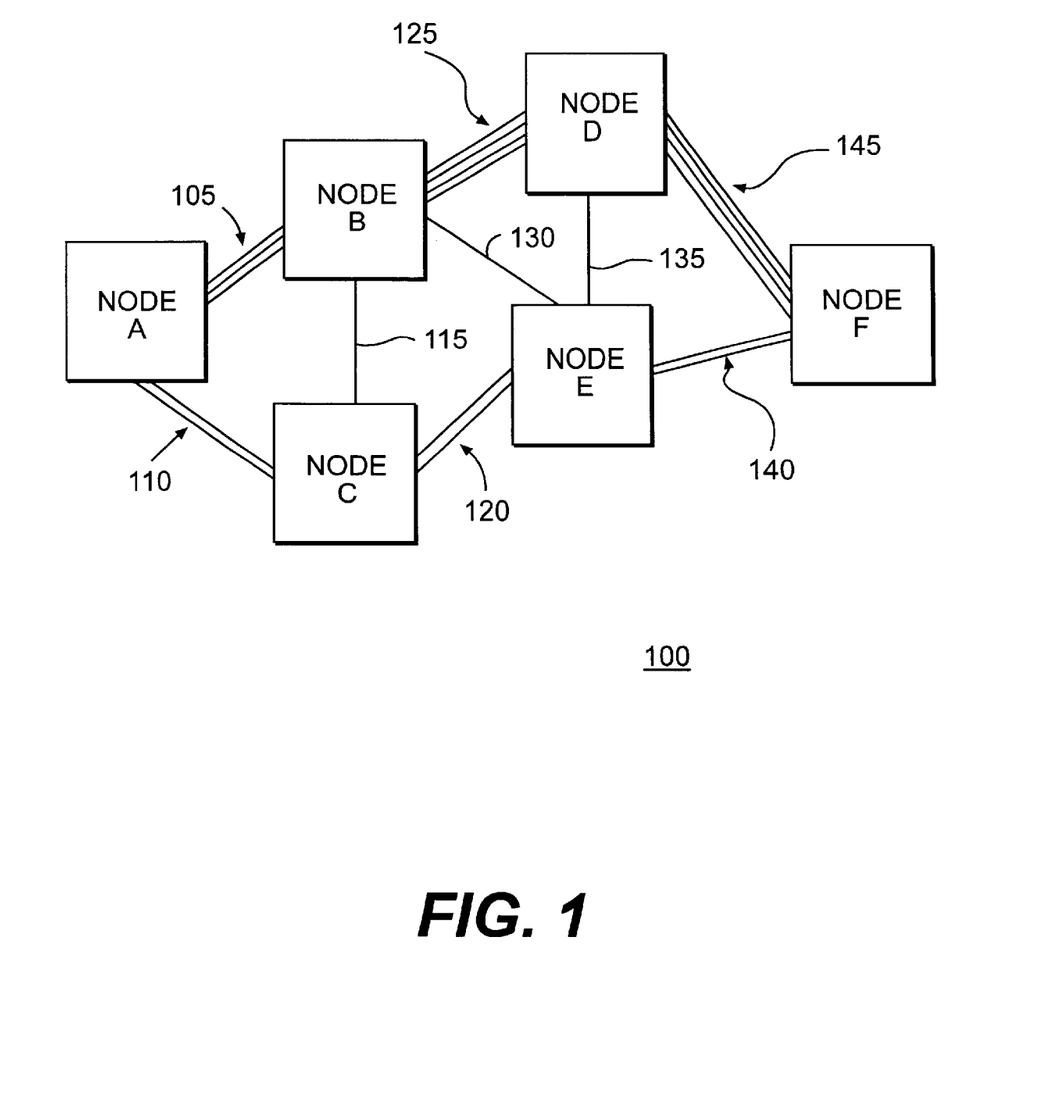
FIG. 1 is a block diagram of an optical network for use with the present invention.

Upgrading an existing optical network to WDM, however, may present additional problems when the multiple links between nodes in the network are not uniform. For example, two links between three network nodes may have different numbers of optical fibers. FIG. 1 illustrates an optical network 100 having links such as 105, 110, and 115 interconnecting nodes such as nodes A, B, and C. Link 105 has 6 fibers (each line representing 2 fibers), link 110 has 4 fibers, and link 115 has 2 fibers. Coordinating these differences in fiber capacity presents challenges to the cross-connect switches within nodes A, B, and C.

Moreover, incorporating some links and nodes already operating with WDM into a larger WDM network presents similar problems when the different links are not uniform. For instance, if some WDM has been used between the links, the number of wavelength channels, the wavelengths themselves, or the transport standards may differ. These inequalities may exist due to the current lack of standardization in many areas of WDM communications. Consequently, optical cross-connect switches (OXCs) within the various network nodes must interface the incoming and outgoing optical fibers while maintaining compatibility with the varying optical standards used by the neighboring links.

In order to permit optical communication through an existing network like 100, nodes A–F are equipped with OXCs whose task is to switch the optical channels coming from N input fibers to N output fibers. In general, the possible OXC architectures can be divided into two main classes: fiber-routing cross-connect switches (FR-OXCs), wavelength-routing cross-connect switches (WR-OXCs), and combinations of them. FR-OXCs are also known as optical switches.

Figure 2:
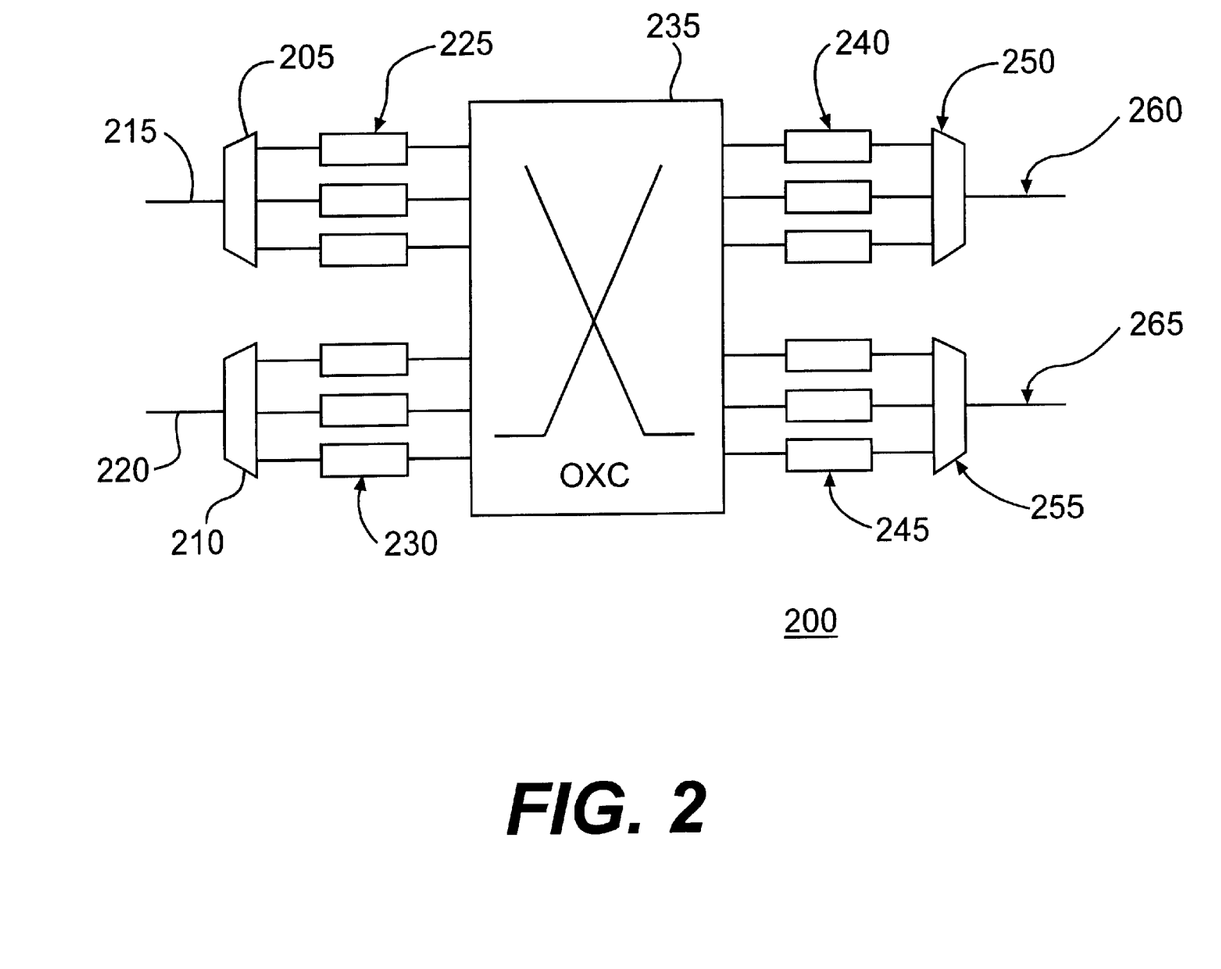
FIG. 2 is a block diagram of a wavelength routing optical cross-connect switch for use with the present invention.

FIG. 2 illustrates a typical scheme of a WR-OXC. The WR-OXC performs routing channel by channel, thereby allowing channels from the same input fiber to be sent to different output fibers. WR-OXC 200 includes demultiplexers 205 and 210 for separating the signals traveling in received WDM combs via optical fibers 215 and 220. After the demultiplexing, optional 3R regenerators or transponders 225 and 230 can provide both signal regeneration and wavelength adaptation for each of the wavelengths entering WR-OXC switch 235. Transponders 225 and 230, if present, convert the wavelengths to a grid used particularly by switch 235 and are typically realized by electro-optic techniques. This wavelength conversion, if present, makes the large network opaque with respect to carrier wavelengths, although all-optical networks are envisioned for the future that perform all phases of transmission, amplification, and switching in the optical domain. After passing through switch 235, where any entering wavelength may be switched to any exiting path, the respective wavelengths can pass through optional output transponders 240 and 245, are combined in multiplexers 250 and 255, and exit via optical fibers 260 and 265. Optional output transponders 240 and 245 can convert the carrier wavelengths to the particular value required by the network downstream of WR-OXC 200.

In contrast to the WR-OXC, an FR-OXC has the task of switching entire optical WDM combs between input fibers and output fibers without demultiplexing the optical channels. Adding or dropping of entire WDM combs from or to another optical network entity via the FR-OXC is also possible. Like the WR-OXC, the FR-OXC is statically configured based on a routing table and is reconfigured when the traffic changes. No regeneration is present in the FR-OXC, since the individual WDM channels are not demultiplexed. It is evident that once the number of input and output optical fibers is fixed, a WR-OXC has more switching versatility than an FR-OXC. Due to this increased complexity, WR-OXCs cost more than FR-OXCs.

In a wide area network, such as 100, each node processes and switches a certain number of local channels and a certain number of passthrough channels. The local channels are generated or terminated at destinations affiliated with the node, while the passthrough channels are routed through the node to elsewhere in the network. If the number of nodes is more than a few dozen, the majority of network nodes generally has many more passthrough channels than local channels. These majority of nodes are called transit nodes. The number of local channels exceeds the number of passthrough channels in only a few nodes, which are called hub nodes.

Patents and publications have contemplated the combination of WR-OXCs and FR-OXCs into a tandem switch structure in certain circumstances. For instance, U.S. Pat. No. 5,457,556 discloses an OXC system having a space switch with first and second inlet ports and first and second outlet ports. The first inlet and first outlet ports receive, switch, and transmit entire WDM combs within the space switch. A wavelength switch has first inlet ports connected to the second outlet ports of the space switch via a demultiplexer and first outlet ports connected to the second inlet ports of the space switch via a multiplexer. The wavelength switch receives selected WDM combs from the space switch, switches individual channels between the combs, and sends the switched channels back to the space switch.

In the '556 patent, system protection occurs at a fiber or multiplex section level. Because protection switching is accomplished without demultiplexing a WDM comb, all incoming and outgoing fibers enter and exit the tandem OXC via a space switch, i.e. an FR-OXC. Accordingly, each node in the network, which operates with fiber level protection, has at least an FR-OXC as the input and output for the links to other nodes.

U.S. Pat. No. 5,805,320 discloses an OXC having a combined FR-OXC and WR-OXC where the FR-OXC handles the bypass component for reserve optical transmission lines in a fiber-level protection scheme termed Type A. The WR-OXC is connected to the working optical transmission lines, and connection links interface the two switches together. For Type B and Type C protection schemes that operate at the channel level, the '320 patent discloses a combination of WR-OXC switches for both the working and reserve optical transmission lines without the use of an FR-OXC.

Applicants have observed that the known arrangements for OXCs within an optical network suffer from excessive complexity for fulfilling the needs of both transit nodes and hub nodes. In particular, Applicants have recognized that in an opaque optical network having a channel-level protection scheme, existing configurations of OXCs contain an overabundance of wavelength converters or transponders that leads to unnecessary expense and complexity.

SUMMARY OF THE INVENTION

Applicants have discovered that an opaque optical network that includes transit nodes and hub nodes can be configured more efficiently and cheaply by incorporating tandem OXCs within transit nodes that use FR-OXCs to switch WDM combs passing through the node and WR-OXCs to switch traffic headed for local destinations, and by incorporating at least WR-OXCs within hub nodes to directly receive and switch local traffic. Applicants have further found that an opaque optical network that has a channel-level protection scheme can be configured more efficiently and cheaply by having at least one OXC node of a tandem FR-OXC and WR-OXC architecture.

In one aspect, an optical WDM network consistent with the present invention communicates WDM channels to local destinations via a plurality of nodes and interconnecting optical fibers, where the nodes include at least one transit node and at least one hub node. The transit node includes a transit switch having a fiber-routing portion (FR) and a wavelength-routing portion (WR), where the fiber-routing portion includes a first group of FR inputs coupled to first network optical fibers and a first group of FR outputs coupled to second network optical fibers. The wavelength-routing portion is positioned in a feedback path between a second group of FR outputs and a second group of FR inputs. The fiber-routing portion is capable of switching a WDM comb from any of the first and second FR inputs to any of the first and second FR outputs.

Quantities of the first and second groups of FR outputs of the transit switch are selected such that $C_{FR1} > C_{WR1}$, where $C_{FR1}$ is a switching capacity of the fiber-routing portion and $C_{WR1}$ is a switching capacity of the wavelength-routing portion. The network also has a hub switch within the hub node that has at least a wavelength-routing portion that includes a first group of WR inputs and a first group of WR outputs. The first group of WR inputs is arranged to receive first orders of WDM channels directly from some of third network fibers, and the first group of WR outputs is arranged to transmit second orders of WDM channels to local destination fibers.

In another aspect, an optical WDM network includes a plurality of first optical fibers each carrying WDM channels from at least one upstream node to a transit node and a plurality of second optical fibers each carrying WDM channels from the transit node to at least one downstream node. The network has a transit switch located in the transit node that includes a first optical switch having a plurality of inlets and a plurality of outlets. A first subset of the first-switch inlets is coupled to the first fibers, and a first subset of the first-switch outlets is coupled to the second fibers.

The transit switch also has a second optical switch with a plurality of inlets and a plurality of outlets and a plurality of input transponders and a plurality of output transponders coupled respectively to the second-switch inlets and the second switch outlets. At least one demultiplexer is positioned between at least one of a second subset of the first-switch outlets and ones of the second-switch inlets, and at least one multiplexer is positioned between ones of the second-switch outlets and at least one of a second subset of the first-switch inlets.

The network of the second aspect further includes a plurality of third optical fibers each carrying WDM channels from at least one upstream node to a hub node, a plurality of fourth optical fibers each carrying WDM channels from the hub node to at least one local destination, and a hub switch located in the at least one hub node. The hub switch has at least one demultiplexer coupled to at least one of the third fibers, a plurality of input hub transponders each coupled to a respective output of the at least one demultiplexer, and a third optical switch.

The third switch in the network of the second aspect has a plurality of inlets coupled to the plurality of input hub transponders and a plurality of outlets, and includes a plurality of output hub transponders coupled to the plurality of third-switch outlets, and at least one multiplexer positioned between the plurality of output hub transponders and the fourth optical fibers.

In a third aspect, an optical WDM network consistent with the present invention has a plurality of nodes interconnected by optical fibers and a channel-level protection scheme. The network includes a plurality of first network optical fibers each carrying first WDM channels that have an affiliated first optical channel header with information about the channel-level protection, and a plurality of second network optical fibers each carrying second WDM channels that have an affiliated second optical channel header with information about the channel-level protection.

The network of the third aspect includes at least one optical cross-connect switch made of a fiber-routing portion (FR) and a wavelength-routing portion (WR). The fiber-routing portion includes a first group of FR inputs coupled to the first network optical fibers and a first group of FR outputs coupled to the second network optical fibers. The wavelength-routing portion is positioned in a feedback path between a second group of FR outputs and a second group of FR inputs of the fiber-routing portion. Quantities of the first and second groups of FR outputs are selected based on an expected capacity of the fiber-routing portion with respect to the wavelength-routing portion.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

In accordance with the present invention, an optical WDM network has a plurality of nodes interconnected by optical fibers, where the nodes include at least one transit node for passing a majority of received WDM channels to another node and at least one hub node for passing a majority of received WDM channels to a local destination. The network includes a transit switch located in the transit node that has one FR-OXC coupled to a WR-OXC via demultiplexers, input transponders, output transponders, and demultiplexers. The network further includes a hub switch located in the at least one hub node that has a WR-OXC including at least one demultiplexer, a plurality of input transponders, a plurality of output transponders, and at least one multiplexer.

Figure 3:
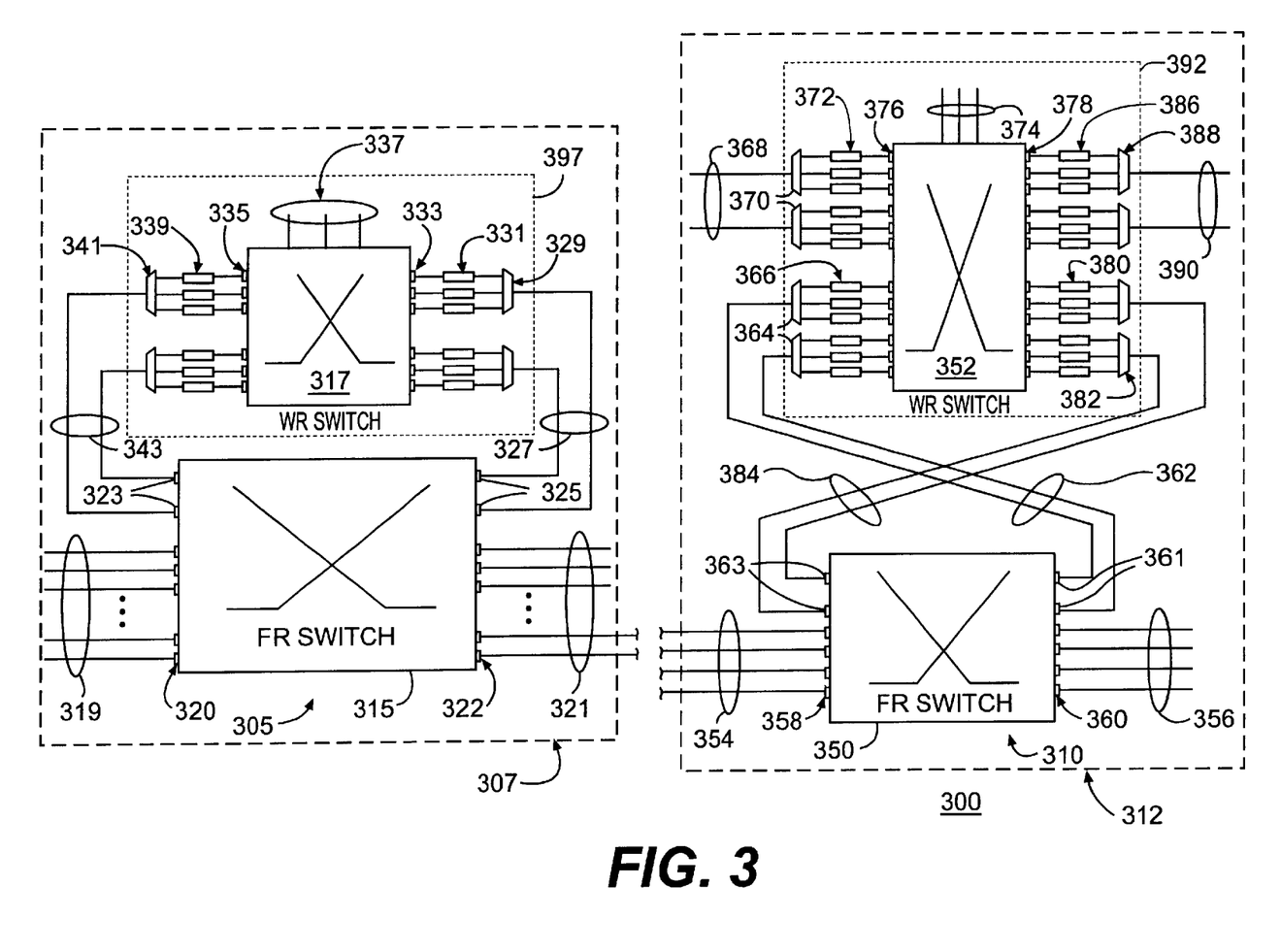
FIG. 3 is a block diagram of optical cross-connect switches within nodes of an optical network consistent with a preferred embodiment of the present invention.

As shown in FIG. 3, and as embodied herein, the optical WDM network consistent with a preferred embodiment of the present invention includes transit switch 305 located within a transit node 307 of the optical network and hub switch 310 located within a hub node 312 of optical network 300. The transit node 307 containing transit switch 305 may be coupled via optical fibers to the hub node 312 containing hub switch 310, although these nodes may be separated by a series of other nodes and interconnecting optical fibers (not shown).

Applicants use the terms "coupled" and "connected" interchangeably in describing the optical relationship of components in the present invention, and those of skill in the art will appreciate that the various components identified herein need not be physically attached to each other to provide the optical coupling that assists in achieving the beneficial results of the invention.

Transit switch 305 includes an optical space switch or FR-OXC 315 and a wavelength switch or WR-OXC 397. FR-OXC 315 has a plurality of inlets 320 for receiving input optical fibers 319 from other nodes within optical network 300. As well, switch 315 has a series of outlets 322 for connecting to other optical fibers 321 that continue on to downstream nodes in network 300. A second set of inlets 323 in switch 315 and outlets 325 optically couple WR-OXC 397 with FR-OXC 315.

As is readily known in the art, space switch 315 receives a comb of WDM channels from each input optical fiber 319, for example, and can switch any of the received combs to any of outlets 322 or 325. Because FR-OXC 315 does not perform demultiplexing on the received WDM combs, the arrangement of channels in an output comb is the same as one received at a switch input. Consequently, passthrough channels having a destination not affiliated with the node containing transit switch 305 can be switched from any of input fibers 319 to any of output fibers 321 via the switch matrix within 315.

FR-OXC 315 may be constructed, for example, by combination or integration of elementary switches, e.g., 2×2 switches. Examples of technologies that can be used for making the switching matrix are opto-mechanics, thermo-optics, electro-optics, etc., or combinations of the above. The precise construction, however, is not material to carrying out the present invention and is within the discretion of the practitioner.

Wavelength switch WR-OXC 397 is optically positioned in a feedback path between outlets 325 and inlets 323 of FR-OXC 315. In particular, optical fibers or similar waveguides 327 communicate combs of WDM channels from outlets 325 to demultiplexers 329. Demultiplexers 329 separate the combs of WDM channels into discrete paths for the separate wavelengths in a conventional fashion. Wavelength converters or transponders 331 are positioned within each output path of demultiplexers 329 and convert the received wavelengths to a characteristic grid of wavelengths prearranged for WR-OXC 397. The converted wavelengths are provided to inlets 333 of an optical switch 317.

Switch 317 may be constructed, for example, by combination or integration of elementary switches, e.g., 2×2 switches. Examples of technologies that can be used for making the switching matrix are opto-mechanics, thermo-optics, electro-optics, etc., or combinations of the above. The precise construction, however, is not material to carrying out the present invention and is within the discretion of the practitioner.

Switch 317 switches any of the channels received at inlets 333 to any of outlets 335 or local fibers 337. Switch 317 can also switch any of the channels received from local fibers 337 to any of outlets 335. Channels exiting at outlets 335 have destinations at other downstream nodes within optical network 300, while channels exiting through local fibers 337 have destinations local to the node containing transit switch 305. For those channels exiting switch 317 at outlets 335, transponders 339 convert the respective wavelengths from the predetermined grid of WR-OXC 397 to appropriate center wavelengths for transmission to the respective downstream destination.

Transponders 339 and 331 may perform several functions in switch 305. For one, as mentioned, the transponders adapt the wavelength channels to a prearranged grid for the switch fabric in WR-OXC 317. In this way, the transponders in opaque network 300 adapt the wavelengths traveling across optical fiber lengths between WDM systems that potentially have different optical transport standards. As well, transponders such as 331 and 339 allow regeneration and termination of the optical channel header. As is readily known to one of ordinary skill in the art, an optical transport network can include an optical channel header, which conveys the information related to a respective optical channel. Transponders within an OXC provide an opportunity for regenerating, reprocessing, or revising an optical channel header. As explained below, regeneration of the optical channel header within transponders 331 or 339 also can enable efficient operation of a channel-level protection scheme for network 300.

Multiplexers 341 combine the discrete channels from transponders 339 into a comb of WDM channels, which optical fibers or similar waveguides 343 return to FR-OXC 315 through inlets 323. FR-OXC 315 can then switch the WDM combs received from WR-OXC-317 to any of outlets 322 for transmission to a downstream destination via fibers 321.

If a certain WDM comb does not need demultiplexing, it can be simply routed through the FR-OXC 315 to a particular fiber 321. If demultiplexing is needed, the WDM comb is routed to WR-OXC 397. This is surely true for WDM combs containing local channels destined for fibers 337 and can be needed also for those combs containing channels directed towards a different fiber or a different wavelength on the same fiber.

Consistent with the present invention, the number of outlets 322 and 325 in switch 315 are respectively selected in accordance with a desired capacity for passthrough channels as opposed to local channels to be handled by transit switch 305. That is, in a typical transit node, the number of passthrough channels received at inlets 320 and transmitted through outlets 322 greatly exceeds the number of local channels dropped or added by WR-OXC 397 at fibers 337. OXC 305 is generally statically configured by means of a configuration table, and reconfiguration is needed only when the network is set up again due to a great change in the traffic characteristics or when shared protection has to be carried out.

The capacities of WR-OXC 397 as opposed to FR-OXC 315 can be depicted as values $C_{WR1}$ and $C_{FR1}$, respectively. $C_{FR1}$ equals $N_{FR1} \times \Lambda_{FR1} \times R_{FR1}$, where $N_{FR1}$ is the quantity of the first group of FR outputs 322 associated with optical fibers 321, $\Lambda_{FR1}$ is the number of channels per FR output in the first group 322, and $R_{FR1}$ is the bit rate per channel. $C_{WR1}$ similarly equals $N_{WR1} \times \Lambda_{WR1} \times R_{WR1}$, where $N_{WR1}$ is the quantity of input fibers of WR-OXC 397, that in the case shown in FIG. 3 coincides with the quantity of fibers in the feedback path 327 corresponding to the second group of FR outputs 325, $\Lambda_{WR1}$ is the number of channels per FR output in the second group 325, and $R_{WR1}$ is the bit rate per channel. For transit switch 305, $C_{FR1}$ is selected to be greater than $C_{WR1}$. As described more fully below, this relationship helps to minimize the equipment dedicated to switch 305 for performing the expected switching functions. Typically $C_{FR1}$ is selected to be greater than 2 $C_{WR1}$ Preferably, $C_{FR1}$ is selected to be much greater than $C_{WR1}$.

As illustrated in FIG. 3, network 300 also includes a hub switch 310 within a hub node 312 that has a space switch FR-OXC 350 and a wavelength switch WR-OXC 392. Hub switch 310 is preferably configured similarly to transit switch 305 in that FR-OXC 350 receives a plurality of optical fibers 354 from upstream nodes in network 300 and is connected to output fibers 356 that pass communications to downstream nodes in network 300. Inlets 358 and outlets 360 on FR-OXC 350 interface the switch to fibers 354 and 356, respectively. Outlets 361 pass combs of WDM channels from FR-OXC 350 to optical fibers or optical waveguides 362. Demultiplexers 364 separate the WDM comb into discrete wavelengths at its output, and transponders 366, coupled to inlets 376 of an optical switch 352, convert the individual wavelengths to the characteristic switching grid of WR-OXC 392.

Consistent with the present invention, switch 352 in WR-OXC 392 also receives discrete channels for switching from optical fibers 368 via demultiplexers 370 and transponders 372. Fibers 368, like fibers 354, provide combs of WDM channels to hub switch 310 from upstream nodes in network 300. Preferably, fibers 368 carry channels destined for local fibers 374 affiliated with the hub node. As a result, these channels may avoid a switching stage through FR-OXC 350, and may pass to local fibers 374 with less attenuation.

In a conventional manner, switch 352 may switch any of the channels received at inlets 376 to any of outlets 378 or local fibers 374. Switch 352 may also switch any of the channels received at local fibers 374 to outlets 378. Output transponders 380 individually adapt the respective output wavelengths to a predetermined wavelength characteristic for its downstream destination. Multiplexers 382 combine the individual channels from transponders 380 into WDM combs for return to FR-OXC 350 through optical fibers or similar optical waveguides 384 and inlets 363 of FR-OXC 350. Output transponders 386, like transponders 380, convert channels received from switch 352 to respective prearranged center wavelengths for downstream needs, and multiplexers 388 combine the individual channels into a WDM comb. Output optical fibers 390 communicate the WDM combs to a destination, which may be a local destination, as with fibers 374, or a downstream node destination, as with fibers 356.

Hub switch 310 is configured with a mixture of FR-OXC 350 and WR-OXC 392 to balance the required capacity for switching local channels to fibers 374 and 390 with switching channels for downstream nodes to fibers 356 and 390. In the nature of the hub node, hub switch 310 has an equal amount or greater of local traffic compared with passthrough traffic. Thus, WR-OXC 392 includes direct access to input fibers 368 and output 390 and may in general have a larger switching capacity than corresponding WR-OXC 397 in transit switch 305. Similarly, because passthrough traffic is much lower in hub switch 310, FR-OXC 350 may have fewer ports and a lower capacity for space switching than corresponding FR-OXC 315 in transit switch 305.

The capacities of WR-OXC 392 as opposed to FR-OXC 350 can be depicted as values $C_{WR2}$ and $C_{FR2}$, respectively. $C_{FR2}$ equals $N_{FR2} \times \Lambda_{FR2} \times R_{FR2}$, where $N_{FR2}$ is the quantity of the first group of FR outputs 360 associated with output fibers 356, $\Lambda_{FR2}$ is the number of channels per FR output fiber, and $R_{FR2}$ is the bit rate per channel.

$C_{WR2}$ similarly equals $N_{WR2} \times \Lambda_{WR2} \times R_{WR2}$, where $N_{WR2}$ is the quantity of input fibers of WR-OXC 392, i.e., the fibers in the feedback path 362 corresponding to the second group of FR outputs 361 plus input fibers 368 associated with demultiplexers 370 plus input fibers among local fibers 374, $\Lambda_{WR2}$ is the number of channels per fiber, and $R_{WR2}$ is the bit rate per channel. For hub switch 310, $C_{FR2}$ is selected to be less than or equal to $C_{WR2}$. As described more fully below, this relationship helps to minimize the equipment dedicated to switch 310 for performing the expected switching functions. In an embodiment switch 310 includes WR-OXC 392 but no FR-OXC, so that $C_{FR2}$ is zero.

Network 300 preferably operates with a channel-level protection scheme. This is easy to implement in an opaque network due to the extensive use of transponders. In any optical network like 300, failures within an optical link, due for example to the severing of an optical cable between two nodes, can cripple the functionality of the network. For node equipment failures, redundancy within a node can protect against local failure risks. For links between nodes, however, one type of protection may operate at a multiplex level, where a completely redundant WDM comb is passed through separate optical fibers. In a channel-level protection scheme, however, the optical channel header information may be monitored and managed to re-route individual channels around a link failure site. Accordingly, channel-level protection requires the optical switching equipment to demultiplex the WDM combs into discrete wavelengths for access to the optical channel header information.

The following explains some of the advantages to be gained by the optical network of the present invention. In conventional arrangements for transit nodes, an unnecessary capacity within a wavelength switch is provided when a channel-level protection scheme is used. That is, as shown in U.S. Pat. No. 5,805,320, OXCs in channel-level protection networks typically employ wavelength switches at all fiber interfaces to ensure the maximum level of switching versatility. These switches in an opaque network require a transponder corresponding to each switchable wavelength. Generally, only a certain number of them will be really needed, either to cope with transmission problems or to process the optical channel header, and they typically are one of the more expensive items within a WR-OXC for an opaque network. Consequently, the use of FR-OXCs as possible can be effective in decreasing network complexity and cost, while at least some level of WR-OXCs ensure flexible wavelength routing capabilities.

The drawbacks in using only WR-OXCs for opaque optical networks can be understood empirically by analyzing the sample network depicted in FIG. 1. For illustration, assume that this sample network has three hub nodes (nodes A, E, F) and three transit nodes (nodes B, C, D). The traffic loaded onto the network is represented by means of the number of optical paths connecting each node, where each optical path is bi-directional and the WDM systems use four wavelengths. The following Table 1 shows a sample matrix associated with the traffic loaded onto the network.

TABLE 1

|        | Node A | Node B | Node C | Node D | Node E | Node F |
|--------|--------|--------|--------|--------|--------|--------|
| Node A | 0      | 0      | 2      | 0      | 3      | 11     |
| Node B | 0      | 0      | 0      | 2      | 0      | 4      |
| Node C | 2      | 0      | 0      | 0      | 0      | 0      |
| Node D | 0      | 2      | 0      | 0      | 0      | 1      |
| Node E | 3      | 0      | 0      | 0      | 0      | 3      |
| Node F | 11     | 4      | 0      | 1      | 3      | 0      |

As can be understood from this matrix of Table 1, each entry in the matrix represents a channel that has a destination local to the node in its column and row. For instance, Node D has two channels affiliated with Node B that are being switched within it and that have a local destination. The same relationship holds for Node B with respect to Node D. In total, Node B has 6 local channels that it switches, and Node D has 3 local channels.

The traffic can be routed in different ways in the network. In general, the routing is made so as to optimize the network performance. In this example the routing expressed in Table 2 is assumed.

TABLE 2

|        |             | No.      | Traversed Nodes |        |        |        |
|--------|-------------|----------|--------|--------|--------|--------|
| Origin | Destination | of paths | Node 1 | Node 2 | Node 3 | Node 4 |
| A | F | 7 | A | B | D | F |
| A | F | 4 | A | C | E | F |
| A | C | 2 | A | B | C | — |
| A | E | 3 | A | B | E | — |
| B | F | 4 | B | D | F | — |
| B | D | 2 | B | D | — | — |
| D | F | 1 | D | F | — | — |
| E | F | 3 | E | D | F | — |

In Table 2 it can be seen, for example, that seven channels directed from A to F are routed through B and D, while other four channels between the same nodes are routed through C and E.

If the network of FIG. 1 is realized by means of only WR-OXCs, the characteristics of those switches may be evaluated. Exemplary results are provided in Table 3.

TABLE 3

|  | Node A | Node B | Node C | Node D | Node E | Node F |
|---|---|---|---|---|---|---|
| Input/Output Fibers | 5/5 | 9/9 | 5/5 | 9/9 | 6/6 | 6/6 |
| Processed Channels | 16 | 18 | 6 | 17 | 10 | 19 |
| Local Channels | 16 | 6 | 2 | 3 | 6 | 19 |
| Transponders | 32 | 36 | 12 | 34 | 20 | 38 |
| Passthrough Channels | 0 | 12 | 4 | 14 | 4 | 0 |
| Node Utilization (%) | 80 | 50 | 30 | 47 | 41 | 79 |
| Overall Network Utilization (%) |  |  | 55 |  |  |  |

Table 3 summarizes the capacity of a conventional arrangement of WR-OXCs in opaque network 100 of FIG. 1. As mentioned, FIG. 1 shows one line for two optical fibers between nodes. In addition to links 105, 110, and 115 described previously, other links connect Nodes B–F. Link 120 has four fibers between Nodes C and E, link 125 has eight fibers joining Nodes B and D, and link 130 has two fibers between Nodes B and E. Similarly, Nodes D and E are joined by two fibers in link 135, link 140 has four fibers between Nodes E and F, and eight fibers in link 145 join Nodes D and F.

Therefore, Node B, for example, has 18 optical fibers interfaced to it, or 9 input fibers and 9 output fibers as shown in Table 3. Because the WDM systems affiliated with the fibers in this example use 4 channels, Node B has the capacity to receive 36 total input channels and to provide 36 total output channels. From Table 1, it is known that Node B switches 6 local channels. Table 3 indicates the number of passthrough channels for each node, with transit nodes B, C, and D having more passthrough channels than local channels and hub nodes A, E, and F processing more local channels than passthrough channels.

The second row in Table 3 lists the number of total local and passthrough channels processed by each node. Due to the basic structure of a WR-OXC as shown in FIG. 2, it is evident that each node has at least two transponders corresponding to each of its processed channels. One of the transponders is an input transponder such as 225 in FIG. 2, while the other is an output transponder such as 240. These transponders are needed even if no processing of the optical header is required (e.g. when the channel is not terminated) and even for those channels that do not require regeneration due to transmission problems because channel header termination and regeneration need to be guaranteed if the network is reconfigured due to a change in the traffic matrix.

The node utilization row in Table 3 lists the percentage of the total number of channels received by each that are processed by that node. For example, Node B receives 36 total channels on 9 input fibers, but it processes only 18 of those (6 channels for local destinations and 12 for passthrough) for a node utilization of 50%. The remaining 18 channels received by the node pass without processing to other destinations. Consequently, Table 3 shows that the exemplary opaque network of FIG. 1 that uses all WR-OXCs is excessively equipped for switching functions that utilize only a fraction of each node and a fraction of the overall network.

Figure 4:
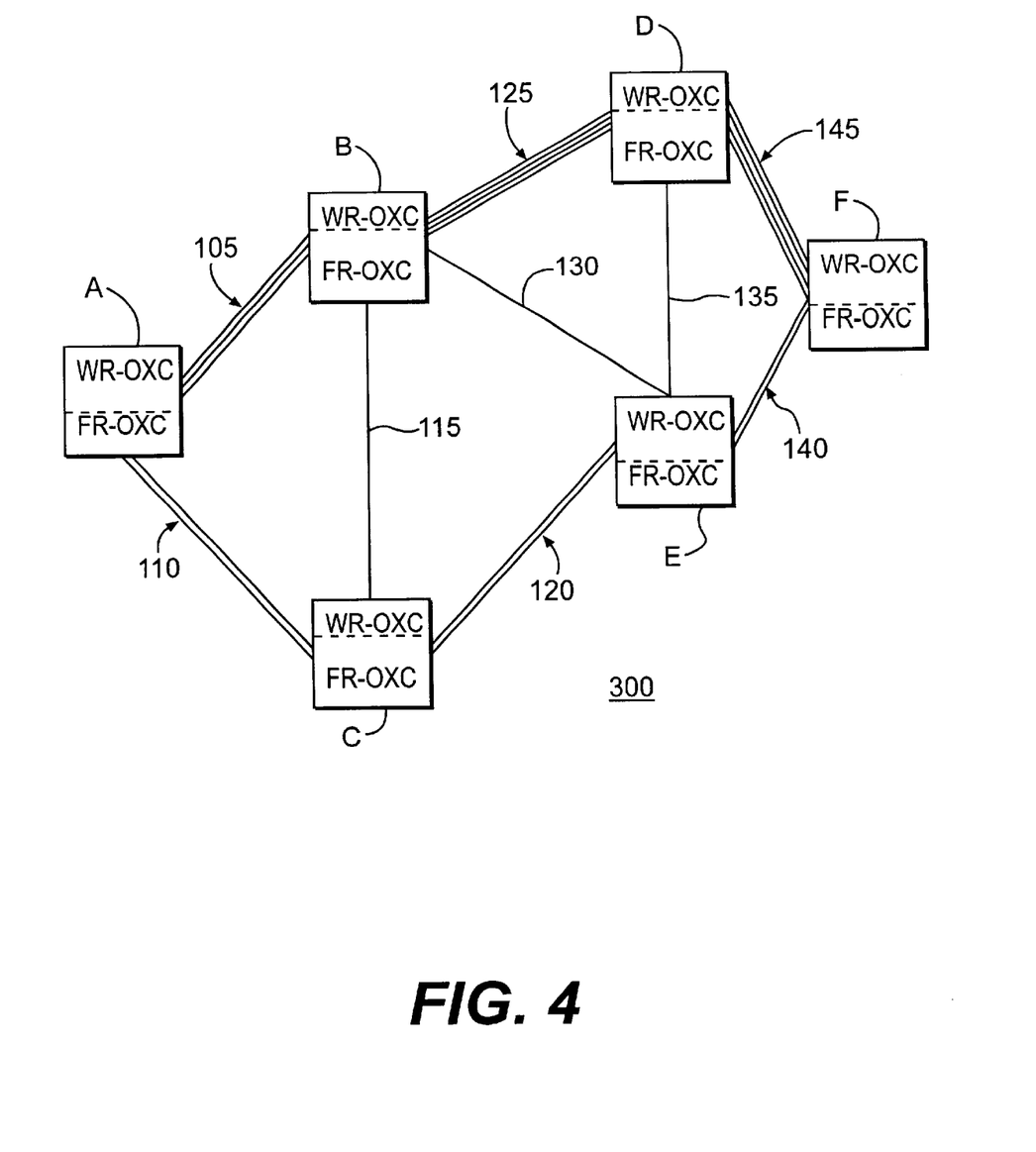
FIG. 4 is a block diagram of an optical network incorporating the optical cross-connect switches of FIG. 3.

FIG. 4 illustrates optical network 300, including the switches depicted in FIG. 3, as applied to the arrangement of Nodes A–F from FIG. 1. As shown in FIG. 4, each of Nodes A–F includes both an FR-OXC and a WR-OXC. Nodes A, E, and F process substantially more local channels than passthrough channels, and therefore, qualify as hub nodes. The switch architectures within these nodes are similar to OXC 305 from FIG. 3. FIG. 4 shows the relative switching capacity between the sub-switch portions in nodes A, E and F, where the WR-OXC area is substantially larger than the FR-OXC area. Indeed, in these hub nodes, the FR-OXC may be omitted altogether to increase the switching simplicity if the number of passthrough channels is de minimus.

The preferred embodiment of the present invention also benefits from decreased material cost. The cost of an optical cross-connect switch within a node depends on the technology used for the optical functions, mainly from the type of optical switches used. Moreover, for opaque networks, the cost of the transponders is very important. A normalized measure of the OXC cost can be obtained with a simple model. Assume that the switch matrixes have crossbar architecture so as to assure complete connectivity. In this case, the cost of a matrix is approximately proportional to the square of the number of its ports. Therefore, the cost $\chi_{SW}$ of the switch fabric of a WR-OXC as shown in FIG. 2 can be written as $$\chi_{SW} = A \times M \times N^2 \tag{1}$$

where N is the number of fibers, M is the number of wavelengths per fiber, and A is a scale factor that depends on the technology. To obtain the cost of the whole OXC, a cost $\chi_{C1}$ of additional features, such as the multiplexer, demultiplexers, electronics, and software has to be added. Moreover, for opaque networks, the cost (2×B×N×M) of the transponders also has to be included, where B is the cost of a transponder. Thus, the total cost $\chi_{WR}$ of the WR-OXC depicted in FIG. 2 in an opaque network (when two transponders are present for each channel that is processed by the OXC) can be represented by the following equation:

$$\chi_{WR} = (A \times M \times N^2) + (2 \times B \times N \times M) + \chi_{C1}. \tag{2}$$

This cost analysis can be extended to apply to a tandem switch having both WR-OXC and FR-OXC components. The cost $\chi_{TW}$ of the WR part can be written according to the following formula:

$$\chi_{TW} = (A \times M \times K^2) + (2 \times B \times K \times M) + \chi_{C2} \tag{3}$$

where K equals the number of fibers entering the WR-OXC switch and $\chi_{C2}$ is the cost of additional features in the WR-OXC. Assuming that the FR-OXC is implemented using a set of 2×2 matrices, the cost $\chi_{TF}$ of the FR-OXC portion of the tandem switch can be written as follows:

$$\chi_{TF} = A(N+K)^2 + \chi_{C3}, \tag{4}$$

where $\chi_{C3}$ is a fixed additional cost. To carry out a useful comparison between the two OXC architectures, one interesting parameter is the ratio between the cost of the WR architecture and that of the mixed FR/WR architecture. This ratio is given by $$\Psi = \chi_{WR}/(\chi_{TW} + \chi_{TF}) \tag{5}$$

Of course, this comparison is meaningful if the same technologies are applied to realize both architectures. Thus, assume that similar switches are used, the system platform is the same in both the cases, and the same network management software is used.

Referring to Node D in network 100 of FIG. 1, the economic advantage of using optical switches with mixed FR-OXC and WR-OXC versus only WR-OXCs becomes apparent. This node has nine input and output fibers and one Add/Drop port including four fibers that is able to process up to four wavelength channels. Under the architecture point of view, the Add/Drop port is equal to an input/output fiber couple, but for the absence of a multiplexer or demultiplexer. Thus, the overall number of ports of the node D is ten. Thus, the needed OXC has N=10 and M=4.

To carry out an evaluation of the $\Psi$ parameter in the case of the opaque network, some hypotheses have to be done regarding transmission issues in the network. In a first scenario, regeneration is never needed to cope with transmission impairments; this would occur when only an FR-OXC is used and when demultiplexing is not needed. In this case, transponders are exploited to generate and process the optical channel header, and then they have to be present at least when an optical channel is created and terminated. In this scenario, if an WR-OXC is used, the losses inside the switch are quite higher, and the need for transponders depends on the technology used inside the switch and on the distances among nodes. However, to allow a correct system working when the traffic changes, transponders must be located after each demultiplexer and before each multiplexer.

In this case, the factor $\Psi$ is given by $$\Psi = \frac{AMN^2 + 2BNM + \chi_{C1}}{AMK^2 + 2BKM + 4A(N+K)^2 + \chi_{C2} + \chi_{C2}} \tag{6}$$

$$\approx \frac{(A/B)MN^2 + 2NM}{(A/B)[MK^2 + 4(N+K)^2] + 2KM}$$

The real value of $\Psi$ depends essentially on the ratio A/B, that is on the technology used for the switch and for the transponders. The values of $\Psi$ are plotted in FIG. 5 for different values of A/B using the example of node D in FIG. 4, where M=4, K=2, and N=10.

Figure 5:
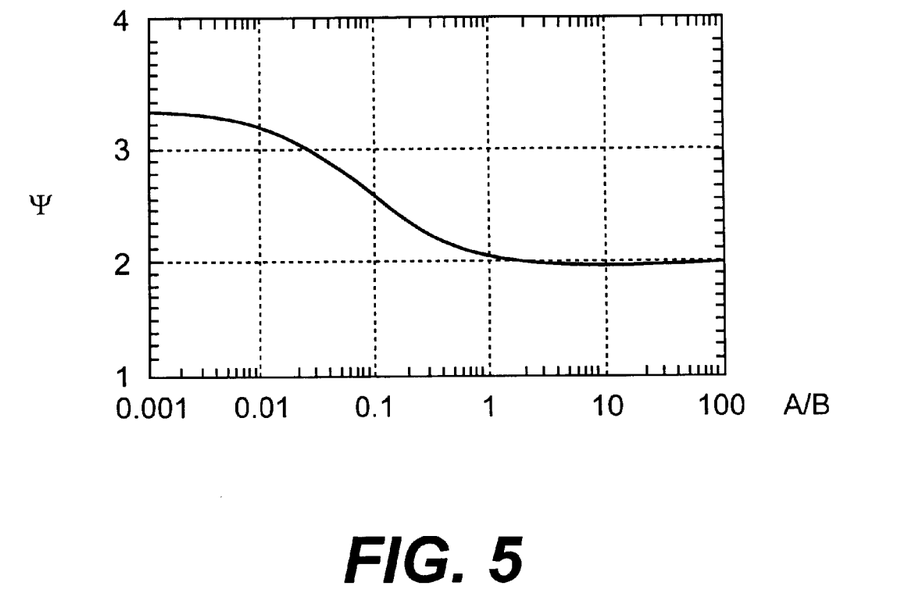
FIG. 5 is a graph plotting the relationship of the cost of a wavelength routing optical cross-connect switch and the cost of a fiber routing optical cross-connect switch versus a ratio of technology constants A/B for one scenario of Node D of FIG. 4.

In FIG. 5, the values of $\Psi$ vary from a maximum of about 3.3, when the OXC cost is practically determined by the sole transponders, to a minimum of about 2, when the cost is determined only by the switch fabrics. It follows that, in the absence of transmission problems, the maximum advantage is gained when the transponders mainly determine the cost of the OXC.

In a second scenario for evaluating the $\Psi$ parameter in an opaque network, transponders are used not only to process the optical channel header but also to correct transmission problems. In this case, even the WDM combs that can be routed as a whole need demultiplexing to be regenerated.

Concentrating on node D of network 100 in FIG. 4, we can identify two situations in which the parameter K has to be evaluated to take into account transmission problems. These situations are summarized in Table 4. The parameter (N+K)/N reported in Table 4 gives a measure of the ratio between the number of ports of the FR-OXC and the number of incoming fibers.

TABLE 4

| Transit Paths to be regenerated | K | (N + K)/N |
| --- | --- | --- |
| A–F | 5 | 1.5 |
| A–F and B–F | 7 | 1.7 |

Figure 6:
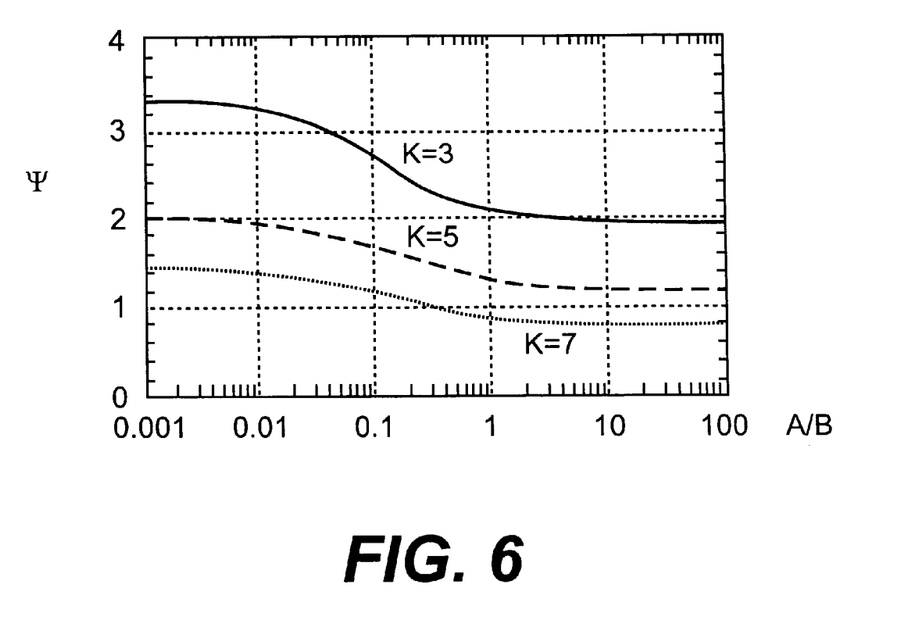
FIG. 6 is a graph plotting the relationship of the cost of a wavelength routing optical cross-connect switch and the cost of a fiber routing optical cross-connect switch versus a ratio of technology constants A/B for one scenario of Node D of FIG. 4 for different configurations of feedback fibers.

The values of the parameter Ψ for the two situations described in Table 4 and for K=3 are shown in FIG. 6 as a function of the value A/B. FIG. 6 shows that an increase of the value of K decreases the advantage derived from the use of the mixed switch having FR-OXC and WR-OXC portions. In the considered case, the WR-OXC has a smaller cost if K=7 and A/B is greater than about 0.13. The above considerations, adapted to the case of a specific network, can assist the skilled in the art in determining whether any node within the network can be advantageously implemented with a WR-OXC architecture rather than with a mixed FR-OXC and WR-OXC architecture. Moreover, for all the values of K, the greater advantage in using the mixed FR-OXC and WR-OXC architecture is attained when the cost of the OXC is mainly determined by the transponders.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical wavelength division-multiplexing (WDM) network for communicating WDM channels to local destinations via a plurality of nodes and interconnecting optical fibers, the nodes including at least one transit node and at least one hub node, comprising:

a transit switch within said transit node having a fiber-routing portion (FR) and a wavelength-routing portion (WR), the fiber-routing portion including a first group of FR inputs coupled to first network optical fibers and a first group of FR outputs coupled to second network optical fibers, the wavelength-routing portion positioned in a feedback path between a second group of FR outputs and a second group of FR inputs, the fiber-routing portion being capable of switching a WDM comb from any of the first and second FR inputs to any of the first and second FR outputs, quantities of the first and second groups of FR outputs of the transit switch being selected such that $C_{FR1} > C_{WR1}$, $C_{FR1}$ being a switching capacity of the fiber-routing portion, $C_{WR1}$ being a switching capacity of the wavelength-routing portion; and a hub switch within said hub node having at least a wavelength-routing portion including a first group of WR inputs arranged to receive first orders of WDM channels directly from some of third network fibers and a first group of WR outputs arranged to transmit second orders of WDM channels to local destination fibers.

2. The optical WDM network according to claim 1, wherein quantities of the first and second groups of FR outputs of the transit switch are selected such that $C_{FR1} > 2 C_{WR1}$.

3. The optical WDM network according to claim 1, wherein the hub switch further comprises a fiber-routing portion having a first group of inputs coupled to others of the third network fibers and a first group of outputs coupled to downstream node fibers, the wavelength-routing portion of the hub switch being positioned optically between a second group of outputs and a second group of inputs of the fiber-routing portion, quantities of the first and second groups of outputs being selected such that $C_{FR2} \leq C_{WR2}$, $C_{FR2}$ being a switching capacity of the fiber-routing portion, $C_{WR2}$ being a switching capacity of the wavelength-routing portion.

4. The optical WDM network according to claim 1, the transit switch further comprising at least one demultiplexer positioned within the feedback path between the second group of FR outputs and the wavelength-routing portion, and an input transponder within each output path of the at least one demultiplexer.

5. The optical WDM network according to claim 4, the transit switch further comprising at least one multiplexer positioned within the feedback path between the wavelength-routing portion and the second group of FR inputs, and an output transponder within each input path to the at least one multiplexer.

6. The optical WDM network according to claim 5, wherein the network operates with channel-level protection and at least one of the input transponder and the output transponder regenerates an optical channel header to monitor channel routing within the network in the event of a link failure.

7. An optical wavelength-division-multiplexing (WDM) network having a plurality of nodes interconnected by optical fibers, the nodes including at least one transit node for passing a majority of received WDM channels to another node and at least one hub node for passing a majority of received WDM channels to a local destination, comprising:

a plurality of first optical fibers each carrying WDM channels from at least one upstream node to a transit node;

a plurality of second optical fibers each carrying WDM channels from the transit node to at least one downstream node;

a transit switch located in the at least one transit node and including a first optical switch having a plurality of inlets and a plurality of outlets, a first subset of the inlets being coupled to the first fibers, a first subset of the outlets being coupled to the second fibers, a second optical switch having a plurality of inlets and a plurality of outlets, a plurality of input transponders and a plurality of output transponders coupled respectively to the second-switch inlets and the second-switch outlets, at least one demultiplexer positioned between at least one of a second subset of the first-switch outlets and ones of the second-switch inlets, and at least one multiplexer positioned between ones of the second-switch outlets and at least one of a second subset of the first-switch inlets;

a plurality of third optical fibers each carrying WDM channels from at least one upstream node to a hub node;

a plurality of fourth optical fibers each carrying WDM channels from the hub node to at least one local destination; and a hub switch located in the at least one hub node and including
  at least one demultiplexer coupled to at least one of the third fibers,
  a plurality of input hub transponders each coupled to a respective output of the at least one demultiplexer,
  a third optical switch having a plurality of inlets coupled to the plurality of input hub transponders and a plurality of outlets,
a plurality of output hub transponders coupled to the plurality of third-switch outlets, and
at least one multiplexer positioned between the plurality of output hub transponders and the fourth optical fibers.

8. An optical wavelength-division-multiplexing (WDM) network having a plurality of nodes interconnected by optical fibers and having channel-level protection, comprising:
  a plurality of first network optical fibers each carrying first WDM channels, the first WDM channels including a first optical channel header with information about the channel-level protection;
  a plurality of second network optical fibers each carrying second WDM channels, the second WDM channels including a second optical channel header with information about the channel-level protection; and
  at least one optical cross-connect switch having a fiber-routing portion (FR) and a wavelength-routing portion (WR), the fiber-routing portion including a first group of FR inputs coupled to the first network optical fibers and a first group of FR outputs coupled to the second network optical fibers, the wavelength-routing portion positioned in a feedback path between a second group of FR outputs and a second group of FR inputs of the fiber-routing portion, quantities of the first and second groups of FR outputs being selected based on an expected capacity of the fiber-routing portion with respect to the wavelength-routing portion.

9. The optical WDM network according to claim 8, further comprising a hub node including a hub switch, the hub switch having at least a wavelength-routing portion including a first group of WR inputs arranged to receive the second WDM channels directly from some of the second network optical fibers and a first group of WR outputs arranged to transmit third WDM channels to local destination fibers.

10. The optical WDM network according to claim 9, wherein the hub switch further comprises a fiber-routing portion having a first group of inputs coupled to others of the second network fibers and a first group of outputs coupled to downstream node fibers, the wavelength-routing portion of the hub switch being positioned optically between a second group of outputs and a second group of inputs of the fiber-routing portion, quantities of the first and second groups of outputs of the fiber-routing portion being selected based on an expected capacity of the fiber-routing portion with respect to the wavelength-routing portion of the hub switch.

11. The optical WDM network according to claim 10, the hub switch further comprising
  at least one demultiplexer positioned within the feedback path between the second group of FR outputs and the wavelength-routing portion, and
  an input transponder within each output path of the at least one demultiplexer, the input transponder regenerating the optical channel header to monitor the routing information about the channel-level protection some of the first WDM channels.

12. The optical WDM network according to claim 11, the hub further comprising
  at least one multiplexer positioned within the feedback path between the wavelength-routing portion and the second group of FR inputs, and
  an output transponder within each input path to the at least one multiplexer.

* * * * *

UNITED STATES PATENT AND TRADEMARK OFFICE
CERTIFICATE OF CORRECTION

PATENT NO. : 6,792,207 B2
DATED : September 14, 2004
INVENTOR(S) : Eugenio Iannone et al.

It is certified that error appears in the above-identified patent and that said Letters Patent is hereby corrected as shown below:

<u>Column 13,</u>
Line 38, after "optical", delete "wavelength division-multiplexing", and insert -- wavelength-division-multiplexing --.

Signed and Sealed this

Fourteenth Day of June, 2005

JON W. DUDAS
*Director of the United States Patent and Trademark Office*